(12) United States Patent
Krishnan et al.

(10) Patent No.: US 8,907,010 B2
(45) Date of Patent: Dec. 9, 2014

(54) FAST SETTING SHEET FED OFFSET INKS WITH NON-AQUEOUS DISPERSION POLYMERS

(75) Inventors: Ramasamy Krishnan, North Brunswick, NJ (US); Mark Schneider, Dumont, NJ (US); Jerome Bollard, Frankfurt am Main (DE)

(73) Assignee: Sun Chemical Corporation, Parsippany, NJ (US)

( * ) Notice: Subject to any disclaimer, the term of this patent is extended or adjusted under 35 U.S.C. 154(b) by 823 days.

(21) Appl. No.: 12/999,388

(22) PCT Filed: Jun. 11, 2009

(86) PCT No.: PCT/US2009/047059
§ 371 (c)(1),
(2), (4) Date: May 4, 2011

(87) PCT Pub. No.: WO2009/155201
PCT Pub. Date: Dec. 23, 2009

(65) Prior Publication Data
US 2012/0016069 A1    Jan. 19, 2012

Related U.S. Application Data

(60) Provisional application No. 61/073,214, filed on Jun. 17, 2008.

(51) Int. Cl.
| C08F 2/32 | (2006.01) |
| C08J 3/11 | (2006.01) |
| C08L 33/06 | (2006.01) |
| C08F 2/06 | (2006.01) |
| C08F 265/06 | (2006.01) |
| C08F 2/22 | (2006.01) |
| C09D 11/107 | (2014.01) |

(52) U.S. Cl.
CPC ... *C08F 2/22* (2013.01); *C08F 2/06* (2013.01); *C08F 265/06* (2013.01); *C09D 11/107* (2013.01); *Y10S 525/902* (2013.01)
USPC ........... 524/801; 524/523; 524/561; 525/902; 526/201

(58) Field of Classification Search
CPC .................................. C08F 2/23; C08L 33/06
USPC .................. 524/517, 801, 523, 561; 525/902; 526/201
See application file for complete search history.

(56) References Cited

U.S. PATENT DOCUMENTS

| 3,847,851 A | 11/1974 | Tugukumi et al. |
| 4,251,412 A | 2/1981 | Ferrini |
| 4,253,397 A | 3/1981 | Emmons et al. |
| 4,278,582 A | 7/1981 | Miller |
| 4,632,961 A | 12/1986 | Tsutsui et al. |
| 5,093,390 A | 3/1992 | Shibato et al. |
| 5,547,804 A * | 8/1996 | Nishizawa et al. ........... 430/114 |
| 5,607,808 A | 3/1997 | Nishizawa et al. |
| 5,698,616 A | 12/1997 | Baker et al. |
| 2002/0058730 A1 | 5/2002 | Kawashima et al. |
| 2003/0078319 A1 | 4/2003 | Sprycha et al. |
| 2005/0085559 A1 | 4/2005 | Hahnle et al. |
| 2005/0244736 A1* | 11/2005 | Yon et al. ....................... 430/115 |
| 2007/0173560 A1* | 7/2007 | Uozumi ........................ 523/160 |
| 2010/0136236 A1 | 6/2010 | Hosoya et al. |

FOREIGN PATENT DOCUMENTS

| CN | 101007917 | | 8/2007 |
| DE | 19511476 A1 | | 11/1995 |
| EP | 1764161 A1 | | 3/2007 |
| EP | 2053069 A1 | | 4/2009 |
| GB | 2434371 A | | 7/2007 |
| JP | S49-020252 | | 2/1974 |
| JP | 03-106970 | | 5/1991 |
| JP | 06-073261 | | 3/1994 |
| JP | 07-268264 | | 10/1995 |
| JP | 07-319221 | | 12/1995 |
| JP | 2000-273381 | | 10/2000 |
| JP | 2006-299039 | | 11/2006 |
| JP | 2006-348189 | | 12/2006 |
| JP | 2006348189 A | * | 12/2006 |
| JP | 2007-197500 | | 8/2007 |
| WO | 03044105 A1 | | 5/2003 |
| WO | 2007068102 A | | 6/2007 |
| WO | WO 2007/068102 | | 6/2007 |
| WO | WO 2007068102 A2 | * | 6/2007 |
| WO | 2009155201 A1 | | 12/2009 |
| WO | 2011014826 A1 | | 2/2011 |

OTHER PUBLICATIONS

Database WPI Week 200747, Thomson Scientific, London, GB; AN 2007-478347, XP002540852 & JP 2006 348189 A (Dynic Corp.) Dec. 28, 2006, Abstract.

* cited by examiner

*Primary Examiner* — Kelechi Egwim
(74) *Attorney, Agent, or Firm* — Charles C. Achkar; Ostrolenk Faber LLP

(57) ABSTRACT

A non aqueous dispersion is disclosed containing: a shell polymer; a core polymer, and a continuous phase solvent, wherein said shell polymer is soluble and said core polymer is insoluble in the continuous solvent. Also disclosed is a method for improving the setting properties of a sheet fed offset ink by adding to the ink the above non aqueous dispersion.

38 Claims, No Drawings

FAST SETTING SHEET FED OFFSET INKS WITH NON-AQUEOUS DISPERSION POLYMERS

CROSS REFERENCE TO RELATED APPLICATIONS

This application is the United States national phase filing of the corresponding international application number PCT/US2009/047059, filed on Jun. 11, 2009, which claims priority to and benefit of U.S. Application No. 61/073,214, filed Jun. 17, 2008, which applications are hereby incorporated by reference in their entirety.

FIELD OF THE INVENTION

The invention relates to non aqueous dispersions containing latex core and shell polymers in an organic solvent and to methods of using said non aqueous dispersions to improve the setting properties of sheet fed offset inks.

BACKGROUND OF THE INVENTION

Sheet fed offset inks generally contain a vehicle prepared by dissolving an alkyd resin, petroleum resin, phenolic resin or modified resin thereof in a drying oil such as linseed oil or dehydrated castor oil or in a petroleum derived solvent boiling at a higher temperature.

Because the mechanism of drying is oxidation whose kinetics is relatively slow, it has not been possible so far to obtain an instant drying sheets similar to those obtained in Xerography which can be further processed such as cutting and binding.

SUMMARY OF THE INVENTION

The present invention provides a non aqueous dispersion comprising:
(a) a shell polymer;
(b) a core polymer; and
(c) a continuous phase solvent,
wherein said shell polymer is soluble and said core polymer is insoluble in the continuous solvent.

The present invention also provides a method for improving the setting properties of a sheet fed offset ink comprising adding to said ink a non aqueous dispersion comprising:
(a) a shell polymer;
(b) a core polymer; and
(c) a continuous phase solvent,
wherein said shell polymer is soluble and said core polymer is insoluble in the continuous solvent.

Other objects and advantages of the present invention will become apparent from the following description and appended claims.

DETAILED DESCRIPTION OF THE INVENTION

It has now been discovered that incorporation of non aqueous dispersions (NADs) of acrylic polymers in a sheet fed ink results in inks that dry dramatically faster than conventional inks.

Non aqueous dispersions (NADs) are comprised of insoluble latexes dispersed in some organic medium. They are attractive additives for ink due to their controlled size, incompatibility, and dispersibility. They have been used successfully in paint to control body, encapsulate pigment, and to provide emulsion-like dispersions in water-free environments.

Previous work focused on generating non aqueous dispersions (NAD) through the use of a solvent control technique. In each case, vinyl monomers (primarily methyl methacrylate, MMA) were polymerized in a good solvent. The solvent chosen was either one in which the monomer was soluble and the resulting polymer was not, or one in which both monomer and polymer were soluble necessitating a solvent switch in order to form dispersion. In either case, the rapid kinetics of the MMA reaction often led to an over gelled, non dispersible product. Also, though many approaches were attempted, a stable, homogeneous NAD product was never obtained.

Given the repeated failure of the solvent-switch mechanism, the current work utilizes a different approach to NAD formation. Here, the NAD is formed by generating a core-shell polymer where the shell is soluble in the continuous phase solvent while the core is insoluble in the solvent yet soluble in the shell polymer. This structure is obtained through a two step polymerization where the shell is formed first and then the core polymer is "filled in", generating a dispersion.

In the preparation of the NAD, the monomers used to make the polymers may comprise a functional group selected from the group consisting of carboxyl group, and hydroxyl group.

Preferably, the carboxyl group containing monomers are selected from the group consisting of acrylic acid, methacrylic acid, itaconic acid and maleic acid. Also preferably, the hydroxyl group containing monomers are selected from the group consisting of 2-hydroxy ethyl acrylate, 2-hydroxy ethyl methacrylate, 2-hydroxy propyl acrylate and 2-hydroxy propyl methacrylate.

The NAD polymers may also be prepared from monomers which comprise a functional group containing vinyl monomer. Preferably, the vinyl monomer is selected from the group consisting of glycidyl acrylate, glycidal methacrylate, and dimethyl amino methacrylate.

Preferably the amount of NAD present in the sheet fed offset ink is at least from about 1% to about 15%, more preferably about 5% and most preferably about 10%. The inclusion of NAD leads to improved drying and processability as indicated by guillotine test.

NAD Formation

The continuous phase used is preferably a common hydrocarbon solvent (such for example Magie #47 oil or Magie N-40 oil). Preferably, the shell polymer is made up of a copolymer of isobutyl methacrylate and dodecyl methacrylate in a ratio of approximately 3:1. The long hydrocarbon chains on these monomers make the resulting polymer readily soluble in Magie oil. Also preferably, approximately 2% of acetic acid is added to aid in efficient polymer formation. In addition, a small amount of glycidylmethacrylate may be added because the epoxy groups in this monomer increase the attraction between the shell and core polymers. Most preferably, the core polymer is primarily methylmethacrylate with 10% N-butyl methacrylate.

EXAMPLE 1

NAD Synthesis

A shell polymer was synthesized containing the ingredients in Table 1 as follows:

TABLE 1

Shell polymer ingredients and synthesis

| Formulation | | | % | Charge (g) | Actual | Actual % |
|---|---|---|---|---|---|---|
| MP | A | Magie N-40 ink oil | 34.05 | 157 | 157.4 | 34.05 |
|  | B | Isobutyl methacrylate | 39.58 | 182.5 | 182.5 | 39.48 |
|  | C | Dodecyl methacrylate | 13.56 | 62.5 | 63.4 | 13.71 |
|  | D | Arcylic acid | 1.08 | 5 | 5 | 1.08 |
| CP | E | Magie N-40 ink oil | 10.84 | 50 | 49.9 | 10.79 |
|  | F | t-butyl peroctoate | 0.43 | 2 | 2 | 0.43 |
|  | G | t-butyl peroxybenzoate | 0.11 | 0.5 | 0.5 | 0.11 |
|  | H | Glycidyl-methacrylate | 0.33 | 1.5 | 1.5 | 0.32 |
|  | I | Triphenyl-phosphine | 0.02 | 0.075 | 0.077 | 0.02 |
|  | J | p-Methoxyphenol | 0.00 | 0.0075 | 0.014 | 0.00 |
|  |  | TOTAL | 100 | 461.082 | 462.291 | 100 |

Briefly, ingredient A was charged to a reactor and heated to 120° C. and held in nitrogen gas. Ingredients B, C and D were pre-mixed(Monomer premixture; MP) as well as ingredients E, F and G(Catalyst premixture; CP). Thereafter, premixtures MP and CP were separately charged to the reactor for 4 hours and held at 120° C. for 4 hours. Then, the nitrogen gas was changed to air and ingredients H, and J were charged and the temperature was again held at 120° C. for 4 hours. The air was then vacuumed for 30 minutes and the temperature cooled to 100° C. followed by discharging the resulting product (shell polymer).

The formation of the core polymer and NAD was carried out as described in Table 2 and as follows:

TABLE 2

NAD ingredients and synthesis:

| Formulation | | | % | Charge (g) | Actual | Actual % |
|---|---|---|---|---|---|---|
|  | A | Magie #N-40 ink oil | 32.69 | 140 | 140.1 | 32.64 |
|  | B | Shell polymer | 31.75 | 136 | 135.1 | 31.47 |
| MP | C | Methyl-methacrylate | 13.31 | 57 | 57.1 | 13.30 |
|  | D | N-butyl methacrylate | 5.37 | 23 | 23 | 5.36 |
|  | E | N-butyl acrylate | 6.28 | 26.9 | 28.2 | 6.57 |
| CP1 | F | Magie #N-40 ink oil | 5.19 | 22.23 | 22.5 | 5.24 |
|  | G | t-butyl peroctoate | 0.26 | 1.11 | 1.1 | 0.26 |
|  | H | t-butyl peroctoate | 0.13 | 0.56 | 0.6 | 0.14 |
|  | I | Methyl-methacrylate | 2.57 | 11 | 11 | 2.56 |
| CP3 | J | t-butyl peroctoate | 0.12 | 0.5 | 0.54 | 0.13 |
|  | K | Magie #N-40 ink oil | 2.33 | 10 | 10 | 2.33 |
|  |  | TOTAL | 100.00 | 428.3 | 429.24 | 100.00 |

Ingredients A and B were charged to a reactor and heated to 85° C. and held in nitrogen gas. Ingredients C and D and E were pre-mixed(Monomer premixture; MP) as well as ingredients F and G (Catalyst premixture 1; CP1) and ingredients J and K (Catalyst premixture 1; CP3). Thereafter, premixtures MP and CP1 were separately charged to the reactor for 4 hours and held at 85° C. for 3 hours. Then, ingredient I was charged followed by premixture CP3 drip wise and the mixture was held for 3 hours. The presence of residual monomers was checked with Gas Chromatography and the resultant product (NAD) was brought to room temperature and discharged.

EXAMPLE 2

Preparation of Sheet Fed Inks and Testing Thereof

A 4 color set of sheet fed inks were prepared containing the NAD prepared in Example 1 and as described in Table 3:

TABLE 3

Ingredients of 4 color set of sheet fed inks

| | Color | | | |
|---|---|---|---|---|
| | BLACK | CYAN | MAGENTA | YELLOW |
| | Formula # | | | |
| | FRE31-1-JB | FRE31-1-JB | FRE31-1-JB | FRE31-1-JB |
| Carbon black | 24.6 | | | |
| Pthalo Blue | | 18.5 | | |
| Magenta pigment | | | 19.5 | |
| Yellow pigment | | | | 12.5 |
| Varnish | 50.8 | 53.6 | 54.6 | 61.1 |
| Oil | 4.0 | 3.5 | 2.8 | 5.0 |
| NAD(Non aqueous dispersion) | 10.0 | 10.0 | 10.0 | 10.0 |
| Wax Conpound | 4.0 | 4.0 | 4.0 | 4.0 |
| Anti Skin | 0.6 | 0.4 | 0.6 | 0.4 |
| Drier | 2.0 | 2.0 | 2.0 | 2.0 |
| Estorob 68 | 4.0 | 8.0 | 6.5 | 5.0 |
| Total | 100.0 | 100.0 | 100.0 | 100.0 |

The above inks were tested on a Heidelberg MO sheet fed press versus a standard set that did not contain any NAD. The paper used was Magnostar (115 gm basis weight). The optical densities of the various colors were: (B=1.90; C=1.45; M=1.50; Y=1.30) as well as for the fountain solution (50/50 tap water/de-ionized water with 3% Sunfount 410).

The rub resistance was done using an industry standard Sutherland rub tester. The guillotine test consisted of cutting a pile of 5000 sheets and seeing if any ink residue is left on the blades.

Fast rub resistance and guillotine test were significantly improved in all inks tested. In addition, the experimental inks were processable after 15 minutes vs almost 1 hr for standard set.

The invention has been described in terms of preferred embodiments thereof, but is more broadly applicable as will be understood by those skilled in the art. The scope of the invention is only limited by the following claims.

What is claimed is:

1. A non-aqueous dispersion comprising:
   (a) a latex shell polymer comprises a copolymer of isobutyl methacrylate and dodecyl methacrylate;
   (b) a core polymer; and
   (c) a continuous phase solvent,
   wherein said shell polymer is soluble and said core polymer is insoluble in the continuous solvent.

2. The dispersion of claim 1, wherein the ratio of the isobutyl methacrylate to dodecyl methacrylate is about 3:1.

3. The dispersion of claim 1, wherein said latex polymer further comprises glycidylmethacrylate.

4. The dispersion of claim 1, wherein said core polymer is a latex polymer.

5. The dispersion of claim 1, wherein said core polymer comprises methylmethacrylate and N-butyl methacrylate.

6. The dispersion of claim 1, wherein said continuous phase solvent is a hydrocarbon solvent.

7. The dispersion of claim 6, wherein said hydrocarbon solvent is an ink oil.

8. The dispersion of claim 1, wherein said polymers are prepared from monomers which comprise a functional group selected from the group consisting of carboxyl group, and hydroxyl group.

9. The dispersion of claim 8, wherein said carboxyl group containing monomers are selected from the group consisting of acrylic acid, methacrylic acid, itaconic acid and maleic acid.

10. The dispersion of claim 8, wherein said hydroxyl group containing monomers are selected from the group consisting of 2-hydroxy ethyl acrylate, 2-hydroxy ethyl methacrylate, 2-hydroxy propyl acrylate and 2-hydroxy propyl methacrylate.

11. The dispersion of claim 1, wherein said polymers are prepared from monomers which comprise a functional group containing vinyl monomer.

12. The dispersion of claim 11, wherein said vinyl monomer is selected from the group consisting of glycidyl acrylate, glycidal methacrylate, and dimethyl amino methacrylate.

13. A sheet fed offset ink comprising the non-aqueous dispersion of claim 1.

14. A method of preparing a non-aqueous dispersion comprising:
   (a) forming a latex shell polymer comprising a copolymer of isobutyl methacrylate and dodecyl methacrylate in a continuous phase solvent; and
   (b) forming a core polymer in the presence of the formed shell polymer of step (a); wherein said shell polymer is soluble and said core polymer is insoluble in the continuous solvent.

15. The method of claim 14 wherein the ratio of the isobutyl methacrylate to dodecyl methacrylate is about 3:1.

16. The method of claim 14, wherein said latex polymer comprises glycidylmethacrylate.

17. The method of claim 16, wherein the formation of the shell polymer takes place in the presence of acetic acid.

18. The method of claim 14, wherein said core polymer is a latex polymer.

19. The method of claim 14, wherein said core polymer comprises methylmethacrylate and N-butyl methacrylate.

20. The method of claim 14, wherein said continuous phase solvent is a hydrocarbon solvent.

21. The method of claim 19, wherein said hydrocarbon solvent is Magie N-40 oil.

22. The method of claim 14, wherein said polymers are prepared from monomers which comprise a functional group selected from the group consisting of carboxyl group, and hydroxyl group.

23. The method of claim 22, wherein said carboxyl group containing monomers are selected from the group consisting of acrylic acid, methacrylic acid, itaconic acid and maleic acid.

24. The method of claim 22, wherein said hydroxyl group containing monomers are selected from the group consisting of 2-hydroxy ethyl acrylate, 2-hydroxy ethyl methacrylate, 2-hydroxy propyl acrylate and 2-hydroxy propyl methacrylate.

25. The method of claim 14, wherein said polymers are prepared from monomers which comprise a functional group containing vinyl monomer.

26. The method of claim 25, wherein said vinyl monomer is selected from the group consisting of glycidyl acrylate, glycidal methacrylate, and dimethyl, amino methacrylate.

27. A method for improving the setting properties of a sheet fed offset ink comprising adding to said ink a non-aqueous dispersion comprising:
   (a) a latex shell polymer comprising a copolymer of isobutyl methacrylate and dodecyl methacrylate;
   (b) a core polymer; and
   (c) a continuous phase solvent,
   wherein said shell polymer is soluble and said core polymer is insoluble in the continuous solvent.

28. The method of claim 27, wherein the ratio of the isobutyl methacrylate to dodecyl methacrylate is about 3:1.

29. The method of claim 27, wherein said latex polymer comprises glycidylmethacrylate.

30. The method of claim 27, wherein said core polymer is a latex polymer.

31. The method of claim 27, wherein said core polymer comprises methylmethacrylate and N-butyl methacrylate.

32. The method of claim 27, wherein said continuous phase solvent is a hydrocarbon solvent.

33. The method of claim 32, wherein said hydrocarbon solvent is an ink oil.

34. The method of claim 27, wherein said polymers are prepared from monomers which comprise a functional group selected/from the group consisting of carboxyl group, and hydroxyl group.

35. The method of claim 27, wherein said carboxyl group containing monomers are selected from the group consisting of acrylic acid, methacrylic acid, itaconic acid and maleic acid.

36. The method of claim 27, wherein said hydroxyl group containing monomers are selected from the group consisting of 2-hydroxy ethyl acrylate, 2-hydroxy ethyl methacrylate, 2-hydroxy propyl acrylate and 2-hydroxy propyl methacrylate.

37. The method of claim 17, wherein said polymers are prepared from monomers which comprise a functional group containing vinyl monomer.

38. The method of claim 37, wherein said vinyl monomer is selected from the group consisting of glycidyl acrylate, glycidal methacrylate, and dimethyl amino methacrylate.

* * * * *